(12) United States Patent
Chul et al.

(10) Patent No.: US 9,325,029 B1
(45) Date of Patent: Apr. 26, 2016

(54) LITHIUM BATTERY HAVING IRREGULARLY SHAPED CASING

(75) Inventors: Yun Ho Chul, East Amherst, NY (US); Barry C. Muffoletto, Alden, NY (US)

(73) Assignee: Greatbatch Ltd., Clarence, NY (US)

(*) Notice: Subject to any disclaimer, the term of this patent is extended or adjusted under 35 U.S.C. 154(b) by 276 days.

(21) Appl. No.: 13/531,706

(22) Filed: Jun. 25, 2012

Related U.S. Application Data

(60) Provisional application No. 61/500,722, filed on Jun. 24, 2011.

(51) Int. Cl.
| | | |
|---|---|---|
| *H01M 10/04* | (2006.01) | |
| *H01M 6/46* | (2006.01) | |
| *H01M 10/28* | (2006.01) | |
| *H01M 2/26* | (2006.01) | |
| *H01M 10/647* | (2014.01) | |

(52) U.S. Cl.
CPC ............ *H01M 10/0486* (2013.01); *H01M 6/46* (2013.01); *H01M 2/263* (2013.01); *H01M 10/0436* (2013.01); *H01M 10/0468* (2013.01); *H01M 10/281* (2013.01); *H01M 10/5032* (2013.01)

(58) Field of Classification Search
CPC .................. H01M 10/0413; H01M 10/0585
USPC ........................................................ 429/208
See application file for complete search history.

(56) References Cited

U.S. PATENT DOCUMENTS

| | | | |
|---|---|---|---|
| 6,432,585 B1 | 8/2002 | Kawakami et al. | |
| 6,946,220 B2 | 9/2005 | Probst et al. | |
| 7,780,745 B2 | 8/2010 | Silverman | |
| 8,232,004 B2* | 7/2012 | Takahashi | 429/211 |
| 2009/0117456 A1* | 5/2009 | Hosaka et al. | 429/152 |
| 2009/0229733 A1* | 9/2009 | Kishioka et al. | 156/60 |
| 2009/0246626 A1* | 10/2009 | Tasaki et al. | 429/208 |

FOREIGN PATENT DOCUMENTS

| | | |
|---|---|---|
| WO | 2009151580 | 12/2009 |
| WO | 2010074690 | 7/2010 |

\* cited by examiner

*Primary Examiner* — Carlos Barcena
*Assistant Examiner* — Wojciech Haske
(74) *Attorney, Agent, or Firm* — Steven W. Winn

(57) ABSTRACT

An economical method for manufacturing an electrode assembly of virtually any shape to fit into a similarly shaped casing without compromising volumetric efficiency is described. This is accomplished by providing an electrode assembly of multiplate anode and cathode plates that substantially match the internal shape of the casing. A layer of adhesive membrane is provided between the plates to keep them together and provide adequate alignment and spacing between electrodes. That way, no matter what shape the device being powered by the cell dictates the electrode assembly assumes, as little internal volume as possible is left unoccupied by electrode active materials.

26 Claims, 11 Drawing Sheets

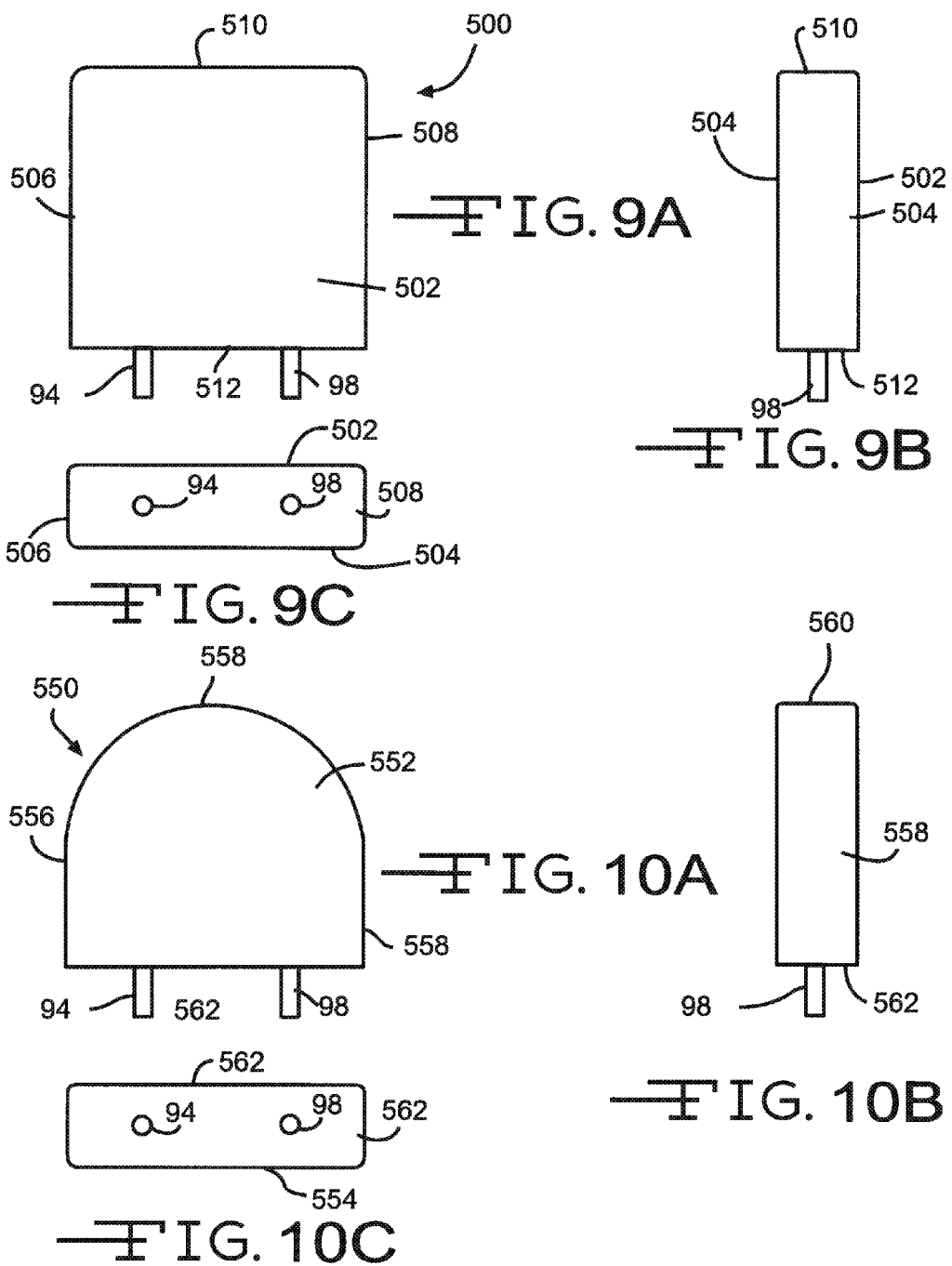

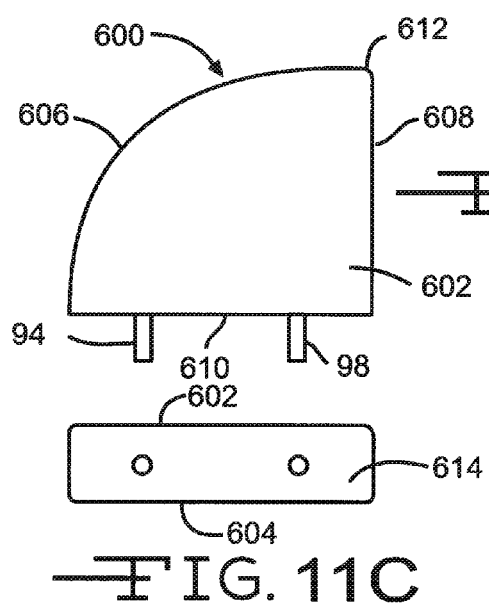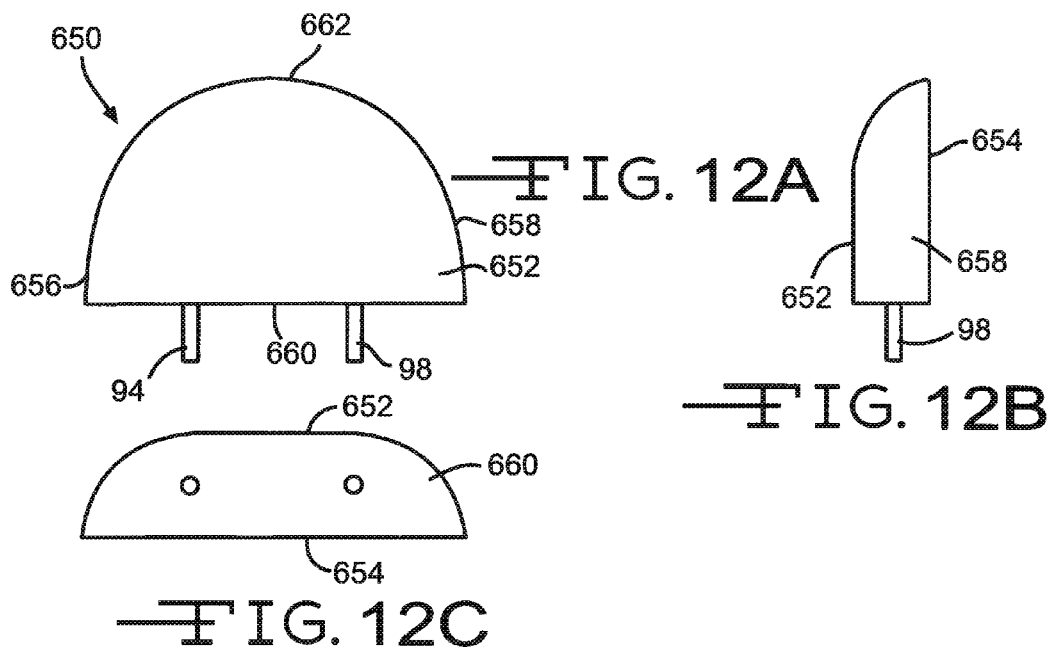

LITHIUM BATTERY HAVING IRREGULARLY SHAPED CASING

CROSS REFERENCE TO RELATED APPLICATIONS

This application claims priority to U.S. provisional application Ser. No. 61/500,722 filed Jun. 23, 2011.

BACKGROUND OF THE INVENTION

1. Field of the Invention

The present invention generally relates to the conversion of chemical energy to electrical energy, and more particularly, to an alkali metal electrochemical cell. The cell can be of either a primary chemistry, for example a lithium/silver vanadium oxide (Li/SVO) cell, or a secondary chemistry, for example a lithium-ion secondary cell.

Currently, lithium-based primary and secondary cells are used in a large number of medical and commercial applications including implantable medical devices, telephones, camcorders and other portable electronic equipment. They come in a variety of shapes, sizes and configurations as coin, button, and cylindrical and prismatic cells. There are several other applications, however, for which lithium-containing cells may be used but for which present day constructions are unsuitable. Such applications include the next generation of medical instruments, implantable medical devices and surgical tools. For many of these applications, the use of prior art lithium-containing cells is unacceptable because of their shape and construction. In certain types of medical applications, irregularly shaped prismatic cells that are sized for use within the human body are most preferred.

2. Prior Art

Currently, lithium-containing cells are used to power a number of implantable medical devices including ventricular assist devices, artificial hearts and implantable hearing aids, among others. The predominantly used method for manufacturing such cells is to position a single anode and a single cathode overlaying each other with an intermediate separator sandwiched between them. This electrode assembly is then wound together about a mandrel.

A representative wound cell electrode assembly 10 is shown in FIG. 1. The electrode assembly 10 comprises an anode electrode 12 and a cathode electrode 14 disposed on either side of an intermediate separator 16. This anode/separator/cathode structure is then positioned on a plate-shaped mandrel having opposed planar sides (not shown) that is rotated to provide the wound assembly shown. The resulting wound electrode assembly 10 has relatively planar opposed sides 18 and 20 extending to curved ends 22 and 24. The upper and lower edges (only upper edge 26 is shown) of the anode 12, cathode 16 and intermediate separator 14 are also relatively planar.

The electrode assembly 10 is then housed in a prismatic-shaped casing 28 (FIG. 2A) of a deep drawn type. Casing 28 is comprised of opposed major face walls 30 and 32 extending to and meeting with generally planar end walls 34 and 36 at curved corners. The face walls 30, 32 and end walls 34, 36 connect to a planar bottom wall 38. A lid 40 secured to the upper edges of face walls 30, 32 and end walls 34, 36, such as by welding, closes the casing. The lid 40 supports a terminal lead 42 insulated from the lid and casing 28 by a glass-to-metal seal 44. There is also a fill opening 46 in the lid closed by a closure means 48, as is well known by those skilled in the art. The lead 42 is connected to one of the electrodes, typically the cathode, while the casing 28 and lid 40 serve as the lead for the other electrode, typically the anode. This describes a case-negative cell design.

FIG. 2B shows a cylindrically-shaped casing 50 closed by a lid 52 supporting a glass-to-metal seal 54 insulating a terminal lead 56 from the lid. Casing 50 is similar to the casing 28 of FIG. 2A except that it is cylindrical instead of being of a prismatic shape. In this case, the mandrel used to wind the electrode assembly is of a cylindrically shaped rod.

Winding an anode/separator/cathode structure limits the geometric configuration of the resulting cell to cylindrical or generally rectangular shapes. In some applications, these shapes are inefficient because the internal casing volume is grossly under-utilized. For example, the curved ends 20, 22 of electrode assembly 10 fit well into the ends 34, 36 of the prismatic-shaped casing 10 (FIG. 2A) and the upper 26 and lower edges fairly match the shape of the lid 40 and bottom wall 38, respectively. However, if the bottom wall of casing 10 is shaped other than relatively planar, that would not be true. Depending on the shape of the bottom wall 38, there could be a large volume of unused space inside the casing. This is because it is difficult to provide wound electrode assemblies having other than planar upper and lower edges.

As such, a variety of multiplate electrode assemblies have been used to address this problem. Such multiplate electrode assembly solutions have been disclosed in U.S. Pat. No. 6,881,514 to Ahn et al., U.S. Pat. No. 6,328,770 to Gozdz, U.S. Pat. No. 6,136,471 to Yoshida et al., as well as U.S. patent application publications 2005/0260490 to Persi et al., and 2007/0100012 and 2009/0208832, both to Beard. These disclosures discuss embodiments utilizing various chemicals to aid in the binding of the electrodes to the separator layer. When laminated together, these chemicals typically block the pore structure of the separator, thereby reducing the performance of the cell.

Still other electrochemical cells have been designed with various mechanical joint methods to hold and stack the electrode and separator plates. Such embodiments have been disclosed in U.S. Pat. No. 4,996,128 to Aldecoa et al., U.S. Pat. No. 5,288,565 to Gruenstern, U.S. Pat. No. 6,627,347 to Fukuda et al., U.S. Pat. No. 7,179,562 to Zolotnik et al., as well as U.S. patent application publications 2001/0041288 to Onishi et al., and 2003/0171784 to Dodd et al. These disclosures provide electrochemical cells with various mechanical joining methods to hold the stacked electrode plates and separators together. These mechanical joining embodiments utilize joints that occupy space within the cell. This space, which could have been utilized by electrochemical materials, reduces the volumetric efficiency of the electrochemical cell. In addition, the mechanical joints of these prior art cells generally have alignment issues in which the electrode plates and separators are not properly aligned. Furthermore, over time, these mechanical joining methods could shift or change due to mechanical stresses and/or chemical reactions within the cell. As a result, the mechanical joining embodiments compromise the electrical performance of the cell.

Accordingly, a need exists for an electrochemical cell with an improved multiplate construction. That, among other things, improves electrode and separator alignment and eliminates separator pore structure blockage in an assembly that maximizes utilization of the cell's internal volume. The electrode assemblies of the present invention are suitably configured for housing in casings of other than the traditional prismatic shape (FIG. 2A) or cylindrical shape (FIG. 2B). Such "irregularly shaped" electrode assemblies and the casings that house them are particularly well suited for powering implantable medical devices, and the like. Medical devices are being implanted in increasingly disparate parts of the body. For this reason, they must be of varied shapes and sizes, which, in turn, drives the shape of the associated power source. Thus, a process is needed for manufacturing electrochemical cells having shapes that take advantage of as much of the internal volume in a casing, even one of an irregular shape, as possible.

SUMMARY OF THE INVENTION

The present invention describes an economical method for manufacturing an electrode assembly of virtually any shape to fit into a similarly shaped casing without compromising volumetric efficiency. This is accomplished by providing an electrode assembly of a multiplate design. The anode and the cathode plates are shaped to substantially match the internal shape of the casing. That way, no matter what shape the medical device dictates the electrode assembly assume, as little internal volume as possible inside the casing is left unoccupied by electrode active materials.

This is accomplished using an adhesive membrane positioned between adjacent anode and cathode electrode plates. The adhesive membrane is positioned between the electrodes such that it joins them therebetween without increasing the electrode assembly volume. In addition, the adhesive membrane provides consistent spacing and alignment between the electrode plates without adversely reacting with the electrolyte within the cell.

These features of the present invention will become increasingly more apparent to those skilled in the art by reference to the following detailed description of the preferred embodiments and the appended drawings.

BRIEF DESCRIPTION OF THE DRAWINGS

FIG. 9A shows a side profile view of an embodiment of an electrochemical cell of the present invention.

FIG. 9B illustrates a side end view of the embodiment of the electrochemical cell shown in FIG. 9A.

FIG. 9C is a front-end view of the embodiment of the electrochemical cell shown in FIG. 9A.

FIG. 10A shows a side profile view of an embodiment of an electrochemical cell comprising an alternate geometric shape of the present invention.

FIG. 10B illustrates a side end view of the embodiment of the electrochemical cell shown in FIG. 10A.

FIG. 10C is a front-end view of the embodiment of the electrochemical cell shown in FIG. 10A.

FIG. 11A shows a side profile view of an embodiment of an electrochemical cell comprising an alternate geometric shape of the present invention.

FIG. 11B illustrates a side end view of the embodiment of the electrochemical cell shown in FIG. 11A.

FIG. 11C is a front-end view of the embodiment of the electrochemical cell shown in FIG. 11A.

FIG. 12A shows a side profile view of an embodiment of an electrochemical cell comprising an alternate geometric shape of the present invention.

FIG. 12B illustrates a side end view of the embodiment of the electrochemical cell shown in FIG. 12A.

FIG. 12C is a front-end view of the embodiment of the electrochemical cell shown in FIG. 12A.

DETAILED DESCRIPTION OF THE PREFERRED EMBODIMENT

The benefits of the present invention are best understood by first illustrating an irregularly shaped casing housing an electrochemical cell. Irregularly shaped casings are becoming increasingly more common, especially in implantable medical devices. These include cardiac defibrillators, cardiac pacemakers, neuro-stimulators, drug pumps, and the like. Such medical devices are designed to reside inside the body so that their shape is as unobtrusive as possible. This, in turn, dictates the shape of the associated power source.

Figure 3:
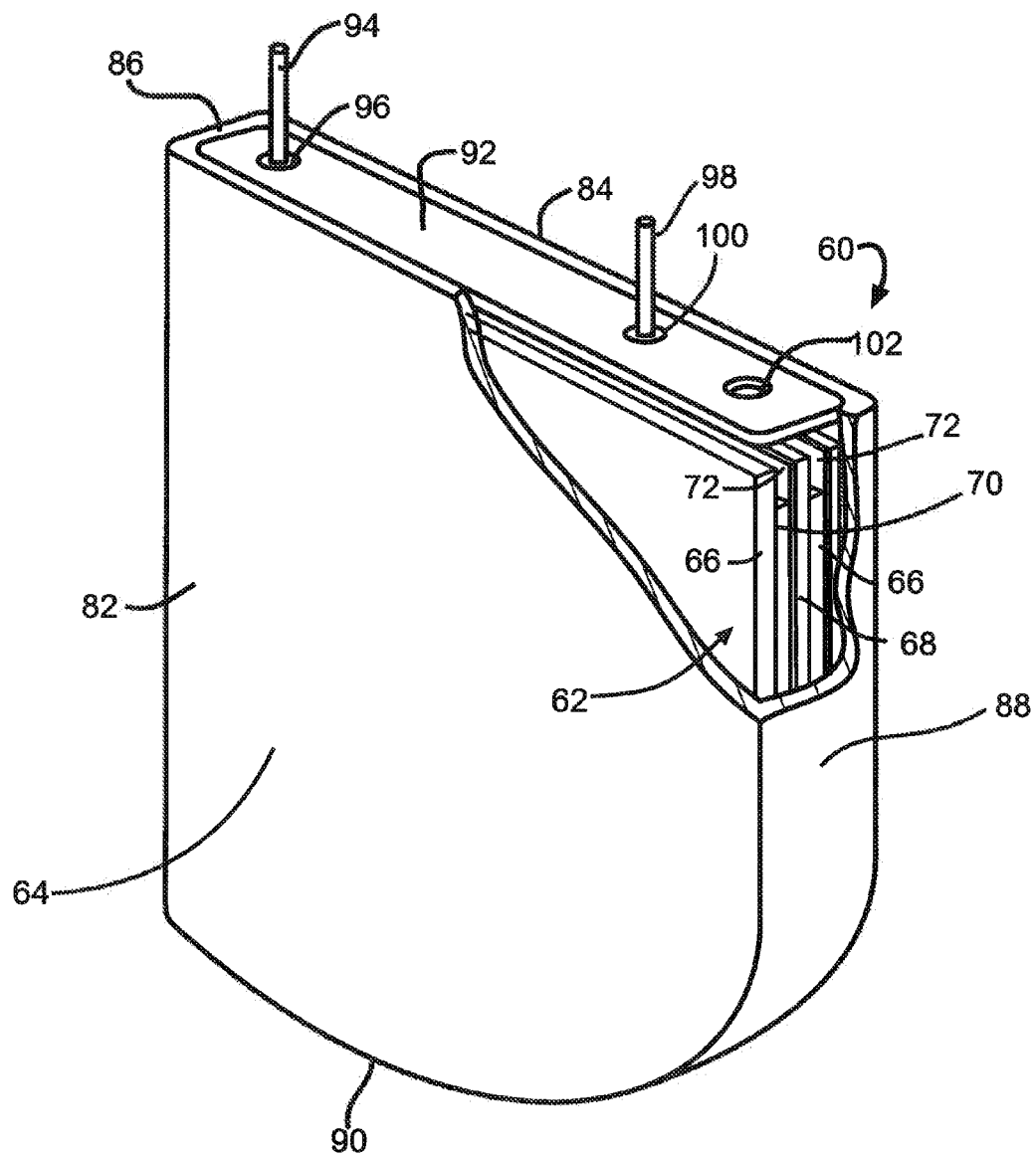
FIG. 3 illustrates a perspective view of an embodiment of an electrochemical cell of the present invention.

FIG. 3 is a perspective view, partly broken away, of an electrochemical cell 60 comprising a multiplate electrode assembly 62 housed in an irregularly shaped casing 64 according to the present invention. The electrode assembly 62 comprises a plurality of anode or negatively charged electrode plates 66 in electrical association with a plurality of cathode or positively charged electrode plates 68 having a separator 70 disposed intermediate each anode and cathode plate to prevent direct physical contact between them.

An adhesive membrane 72 is preferably positioned intermediate each anode and cathode plate 66, 68, about at least a portion of the perimeter of either plate, to bond each of them together. The adhesive membrane 72 comprises a polymeric layer upon which an adhesive material is affixed that facilitates bonding. The adhesive material may reside on either one or both sides of the front and back of the membrane. In a preferred embodiment, the adhesive membrane 72 is designed to hold the anode and cathode plates 66, 68 together within the electrode assembly stack. More specifically, the adhesive membrane 72 is preferably positioned about the perimeter of the electrode plates 66, 68 such that the electrochemical reaction, between the plates, is not, impeded. As will be discussed more in detail, the adhesive membrane 72 may be formed in a strip or single parallel layer formation which is positioned along at least a portion of the perimeter of either of the plates 66, 68. Alternately, the adhesive membrane 72 may be formed in a. "ring like" shape in which the adhesive membrane 72 circumferentially surrounds the active material of either the anode 66 or cathode 68 plate.

Figure 3A:
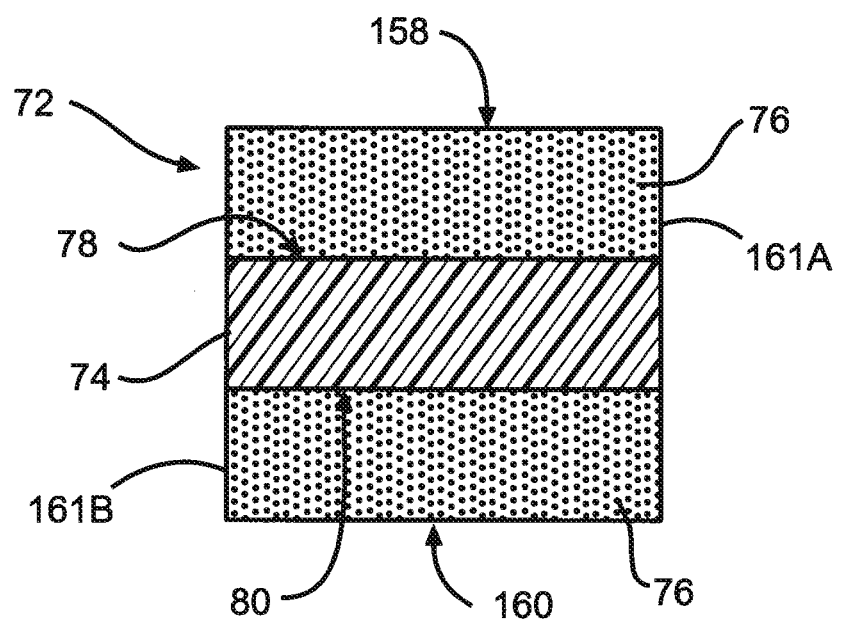
FIG. 3A shows an enlarged cross-sectional view of as section of adhesive membrane according to the present invention.

FIG. 3A illustrates an embodiment of the adhesive membrane 72. The adhesive membrane is preferably composed of a material that does not react with the electrolyte within the cell. This is designed such that the adhesive membrane material does not adversely react within the cell, degrading the cell's electrical performance. More specifically, the adhesive membrane 72 is preferably composed of a silicone or acrylic material. In a preferred embodiment, the adhesive membrane 72 comprises a carrier layer 74 of polypropylene on which an adhesive layer 76 of Acryl resides on a carrier layer top surface 78 and/or a carrier layer bottom surface 80. In a preferred embodiment, the thickness of the carrier layer 74 ranges from about 10 um to about 100 um and the thickness of the adhesive layer 76 ranges from about 1 um to about 10 um. The adhesive membrane 72 may be obtained from Tapex Inc. of Gyeonggi-do Korea.

The adhesive membrane 72 provides many benefits to the electrode stack assembly. First, the adhesive layer 76 of the membrane 72 minimizes movement of adjacent plates within the electrode stack assembly. Second, since the adhesive membrane 72 is positioned between the current collector plates 66, 68 about the perimeter of the plates, the membrane 72 does not occupy additional space within the assembly, thereby facilitating an efficient stack design within the casing 64 of the electrochemical cell 60. Third, the position of the membrane 72 about the perimeter of the plates 66, 68 facilities improved electrode plate alignment and reduces uneven current densities. Fourth, the controlled thickness of the adhesive membrane 72 provides an even cathode-to-anode distance which also ensures a proper electrochemical reaction between adjacent plates 66, 68. Fifth, since the adhesive membrane 72 is positioned about the perimeter of the plates 66, 68 the membrane 72 provides additional electrical insulation between the anode electrode 66 and cathode electrode 68 which minimizes the possibility of an undesirable electrical short circuit therebetween.

Figure 1:
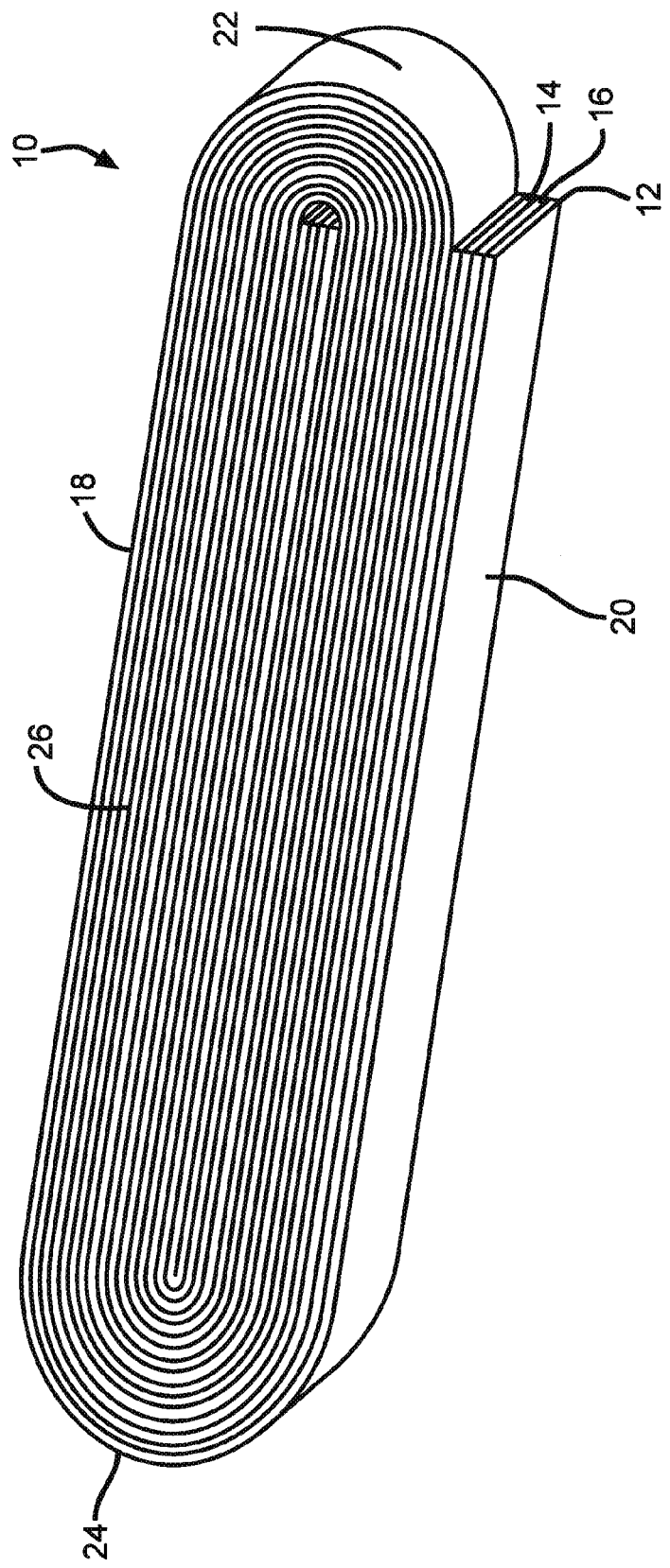
FIG. 1 is a perspective view of a prior art wound electrode assembly.
Figure 2A:
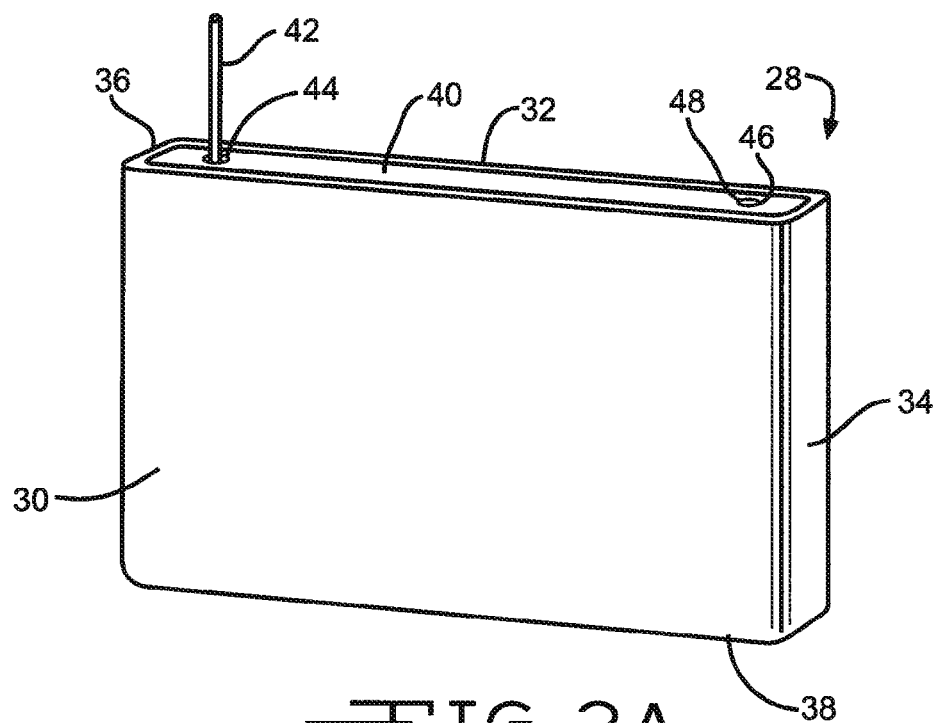
FIG. 2A is a perspective view of a prior art prismatic shaped electrochemical cell.
Figure 2B:
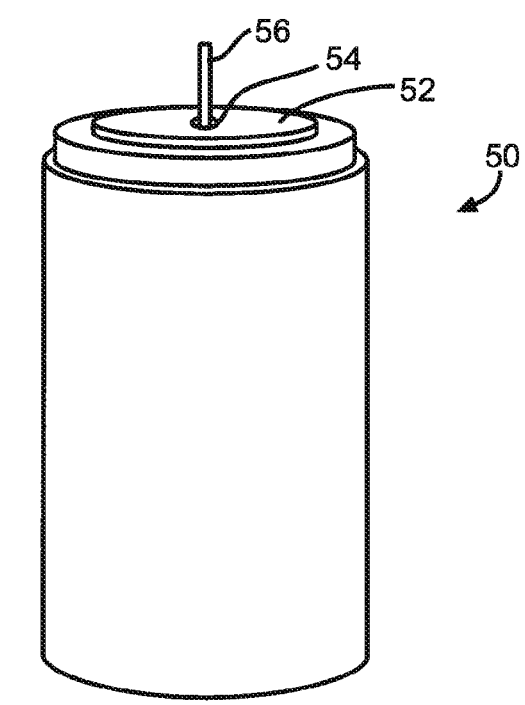
FIG. 2B is a perspective view of a prior art cylindrically shaped electrochemical cell.

Proper alignment of the plates 66, 68 is an important parameter in cell design in that it improves the electrochemical reaction rate. A correct electrode plate alignment is particularly important in lithium ion exchange of secondary cells. Uneven current densities often occur in the coiled electrode design of the electrochemical cell 10 of the prior art (FIG. 1). Many times the construction of these coiled electrode assemblies result in areas of uneven mechanical stresses within the coil. As the coil is wound, generally the inner layers of the coil are wound tighter than the outer coil layers. These uneven stresses within the coil often result in uneven current densities within the coil, which may adversely affect the chemical reactions within the cell. For example, the inner-coiled layers, that are wound tighter, generally have a greater current density than the outer layers. Therefore, these coiled electrode assembly designs are often prone to undesirable electrical performance issues.

If the cell is intended to be of a case-negative configuration, then the outwardly most plates are of the anode electrode, preferably in direct contact with the inside of a casing 64. The casing may comprise materials such as stainless steel, mild steel, nickel-plated mild steel, titanium, tantalum or aluminum, but not limited thereto, so long as the metallic material is compatible for use with components of the cell.

As shown in FIG. 3, the casing 64 is of a deep drawn type having opposed front and back side walls 82 and 84 extending to a left planar end wall 86 and a right planar end wall 88. As illustrated, the left end wall 86 is of a longer length than the right end wall 88. The side walls 82, 84 and end walls 86, 88 each extend to and meet with a bottom wall 90 to form the casing comprising a unitary deep drawn can. Since the left end wall 86 is of a greater length than the right end wall 88, the bottom wall 90 is of an irregular curved shape of a varied radii. This means that if a wound electrode assembly of the type shown in FIG. 1 were housed inside casing 64, there would be a considerable amount of internal volume left unoccupied by active components, especially adjacent to the bottom wall 90. This detracts from volumetric efficiency.

A lid 92 secured to the upper edges of face walls 82, 84 and end walls 86, 88, such as by welding, closes the casing 64. The lid 92 supports an anode terminal lead 94 insulated from the lid and casing by a glass-to-metal seal 96. In addition, in the case of a secondary chemistry, the lid 92 may support a cathode terminal lead 98 insulated from the lid and casing by a second glass-to-metal seal 100. There may also be an electrolyte fill opening 102 in the lid closed by a closure means, such as a stainless steel ball, as is well known by those skilled in the art. The leads 94, 98 are connected to their respective electrodes, either the anode 66 or the cathode 68.

Alternatively, the casing 64 and lid 92 may serve as the lead for either electrode, typically the anode. This describes a case-negative primary cell design. If a case-positive primary cell design is desired, lead 92 is connected to the anode plates 66 while the cathode plates 68 are electrically connected to the casing and the lid.

Figure 4:
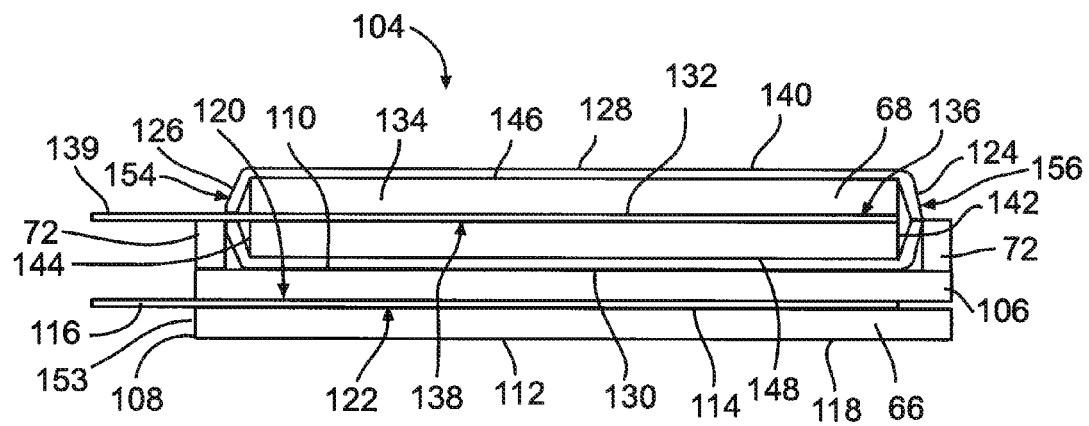
FIG. 4 is a cross-sectional side view of an embodiment of a multiplate electrode assembly according to the present invention.

FIG. 4 illustrates a cross-sectional view of an embodiment of a bi-cell multiplate electrode assembly 104 of the present invention. The multiplate electrode assembly 104 comprises one anode or negative electrode plate 66 and one cathode or positive electrode plate 68. This bi-cell electrode assembly 104 illustrates a basic example of the electrochemical cell 60 of the present invention.

As illustrated, the anode plate 66 comprises an anode right end wall 106 and an anode left end wall 108, both extending from an anode upper wall 110 to an anode bottom wall 112 and being intermediate first and second major sides. An anode current collector 114 extends longitudinally through the anode plate 66 from the anode right end wall 106 to the anode left end wall 108.

As shown, a first anode current collector lead portion 116 extends through the anode left end wall 108. An anode or negative electrode active material 118 contacts both a top 120 and bottom 122 surface of the current collector 114 to form the anode 66. However, the anode material 118 may be positioned such that it only contacts one surface, either the top or bottom surface 120, 122, of the anode current collector 114.

The cathode or positive electrode plate 68 resides immediately adjacent to the anode plate 66. The cathode plate 68 comprises a cathode right end wall 124 and a cathode left end wall 126, both extending from a cathode upper wall 128 to a cathode bottom wall 130 and being intermediate first and second major sides. A cathode current collector 132, comprising a top surface 136 and a bottom surface 138 extends longitudinally through the cathode 68 from the left end wall 126 to the right end wall 124. A cathode or positive electrode material 134 is positioned on the cathode current collector 132. As shown, the cathode material 134 resides on both sides of the cathode current collector 132 to form the cathode 68. However, the electrode assembly may be constructed such that the cathode material 134 only resides on one surface of the cathode current collector 132.

A cathode separator membrane 140 is preferably positioned about the perimeter of the cathode plate 68. As shown in the embodiment of FIG. 4, the cathode separator membrane 140 comprises a separator right end wall 142 and a cathode separator left end wall 144, both extending from a cathode separator upper wall 146 to a cathode separator bottom wall 148 and being intermediate first and second major sides. The cathode current collector 132 preferably extends through one of the cathode separator's right or left end walls 142, 144 to facilitate electrical contact of the cathode current collector. The membrane 140 is preferably constructed of one layer. To maximize efficiency of space within the cell, however, the separator membrane 140 may be constructed of two or more sub-layers.

Figure 4A:
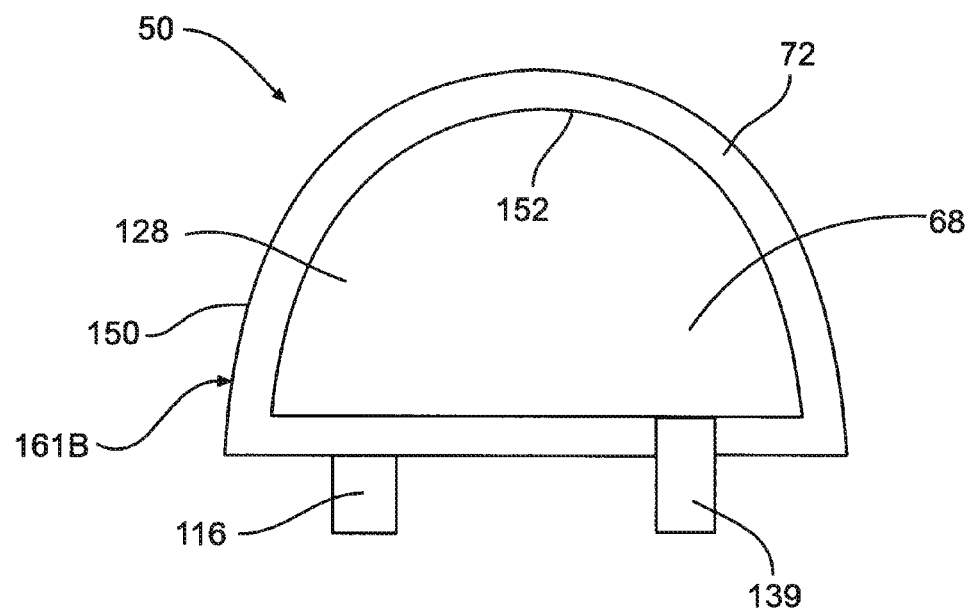
FIG. 4A illustrates a top view of the multiplate electrode assembly of FIG. 4.

As illustrated in FIGS. 4 and 4A, the adhesive membrane 72 is positioned about a perimeter 150 of the anode plate 66. More specifically, the adhesive membrane 72 is positioned within a space extending from about 0.25 inches of an outer edge 153 of the anode plate 66. Furthermore, the cathode plate 68 may be positioned within an inner perimeter 152 of the adhesive membrane 72 such that the adhesive membrane extends circumferentially around the cathode plate 68. In addition, a portion of adhesive membrane 72 may be positioned immediately adjacent an exterior surface 154 of the cathode left end wall 126 and immediately adjacent an exterior surface 156 of the cathode right end wall 124.

As shown in FIG. 3A, the adhesive layer 72 has a thickness that extends from a top surface 158 to a bottom surface 160, the top and bottom surfaces extending between right and left sidewalls 161A and 161B. The thickness of the adhesive membrane 72 is preferably selected such that the top adhesive surface 158 contacts the first lead portion 139 of the cathode plate 68 and a bottom surface 160 of the adhesive membrane 72 contacts the anode material 112. On the opposite side of the stack, a portion of adhesive membrane 72 may be positioned immediately adjacent the right end wall 124 of the cathode plate 68. The bottom surface 160 of the adhesive membrane 72 contacts the top surface of the anode material 112.

As shown in FIG. 4, the adhesive membrane 72 may be positioned such that the right adhesive membrane sidewall 161A is in contact with the cathode plate left wall 126. Furthermore, the bottom surface 160 of the adhesive membrane is in contact with the upper anode wall 110 and the adhesive membrane top surface 158 is in contact with the first cathode lead portion 139.

FIG. 4A illustrates a top view of the electrode plate stack assembly 104 of FIG. 4. As illustrated, the adhesive membrane 72 is positioned such that it surrounds the perimeter of the cathode plate 68. The adhesive membrane 72, by surrounding the perimeter of cathode plate 68, minimizes movement thereof and forms an additional insulation barrier. Alternatively, the adhesive membrane 72 may be positioned along a portion or portions of the perimeter 150 of the anode plate 66.

Figure 5:
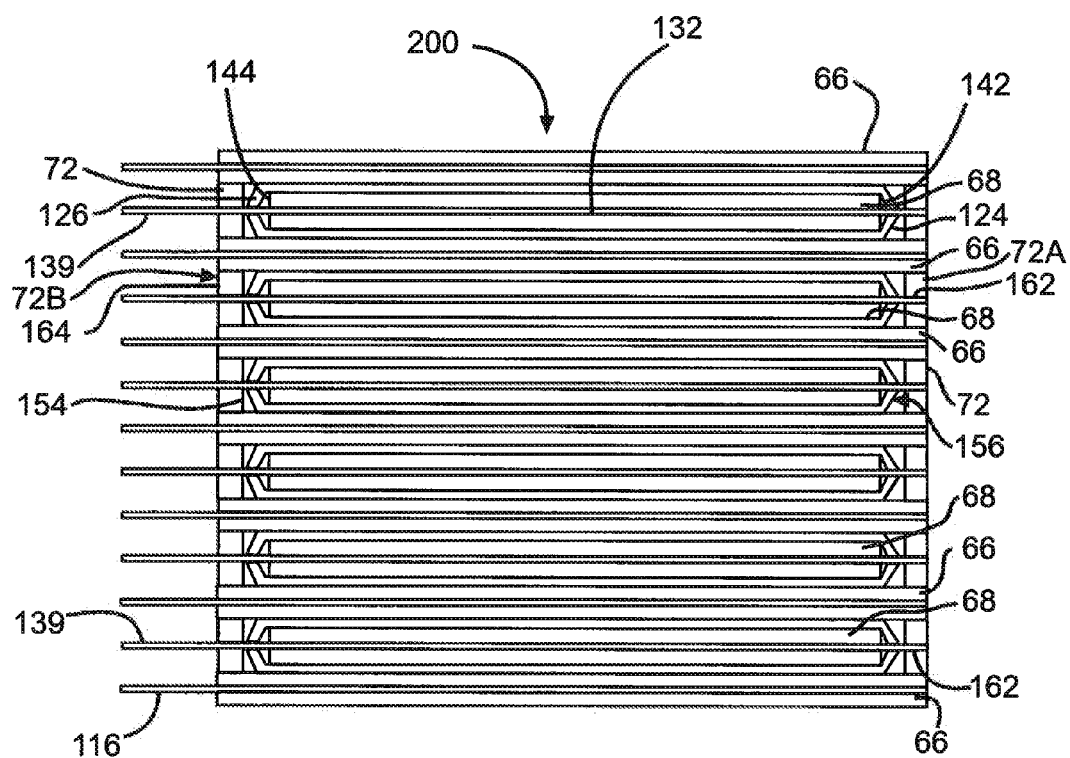
FIG. 5 is a cross-sectional side view of an alternate embodiment of a multiplate electrode assembly of the present invention.
Figure 6:
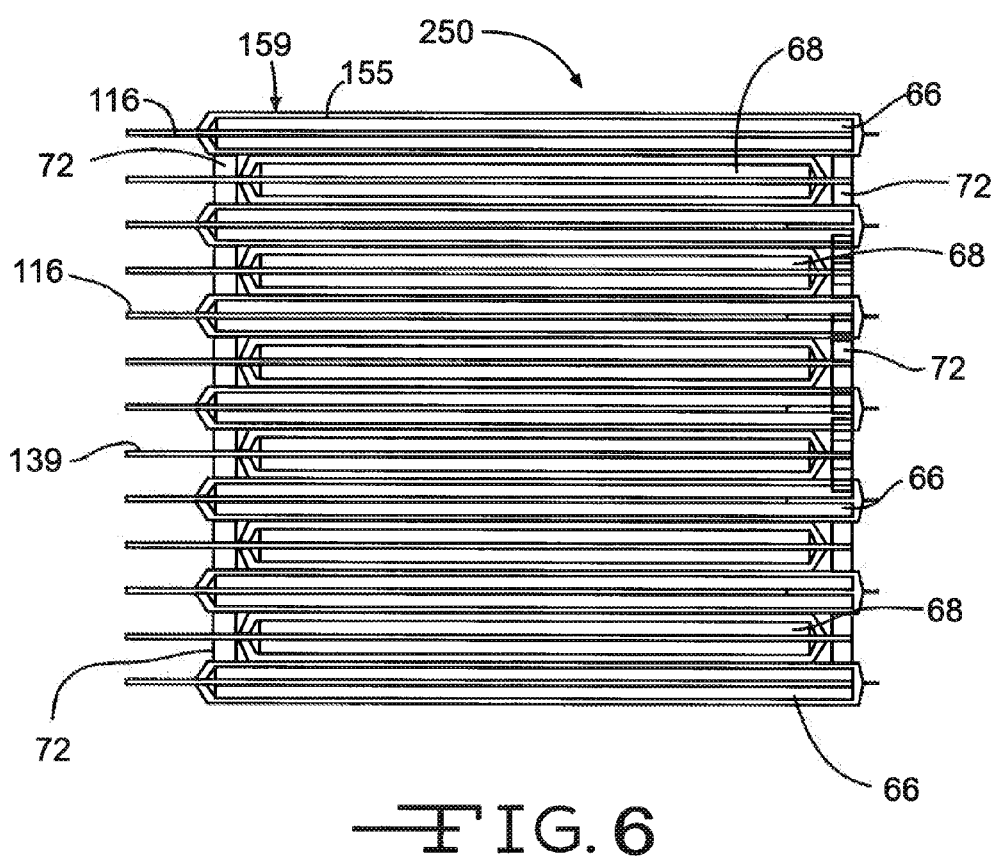
FIG. 6 is a cross-sectional side view of an alternate embodiment of a multiplate electrode assembly of the present invention.
Figure 8:
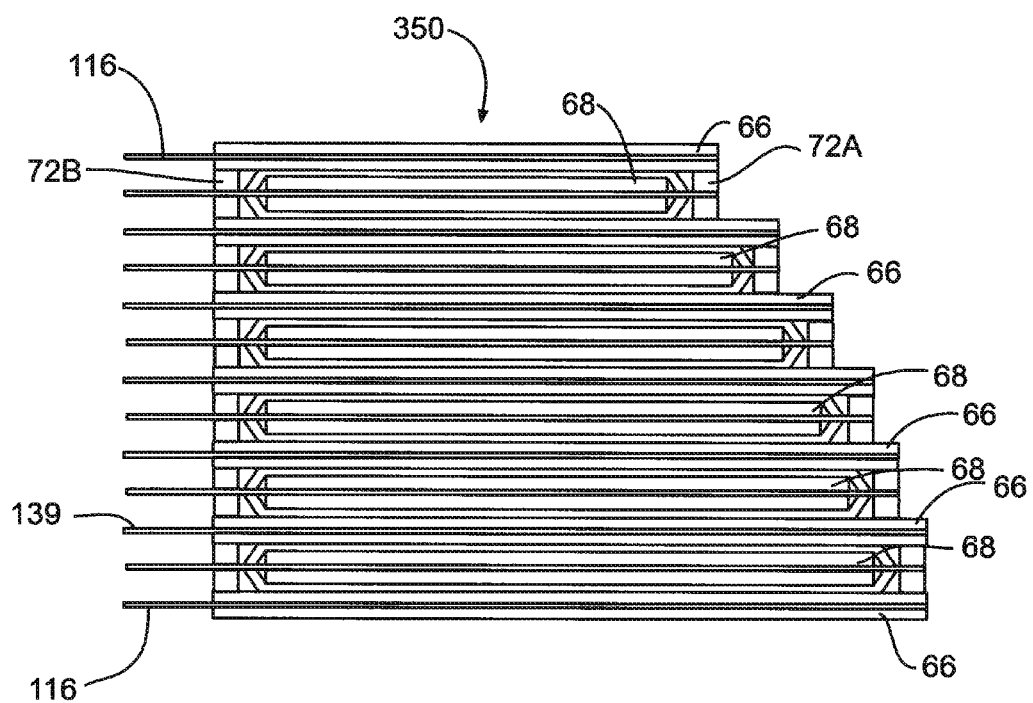
FIG. 8 is a cross-sectional side view of an alternate embodiment of a multiplate electrode assembly comprising electrode plates of uneven length.

The electrode plate assembly embodiments illustrated in FIGS. 5, 6, and 8, are most beneficial in the construction of a secondary electrochemical cell. As shown, the carbonaceous anode plate 66 extends beyond that of the cathode plate 68. That way, there is always a portion of the anode 66 opposite the lithiated cathode active material 134 so that as the cell is being recharged, the lithium ions intercalate into the carbonaceous anode material and do not plate out as dendritic formations. Dendrites are undesirable as they can lead to cell shorting.

FIGS. 5-8 illustrate various non-limiting embodiments of multiplate electrode assemblies of the present invention. FIG. 5 illustrates an embodiment of an electrode assembly 200 comprising seven anode plates 66 and six cathode plates 68 that are sandwiched together in an alternating orientation. As shown in FIGS. 3 and 5, the cathode current collector 132 extends through both the left and right end walls 144, 142 of the cathode plate 68. In particular, the first lead portion 139 extends past the cathode plate left wall 126 while a second cathode current collector lead portion 162 extends past the cathode plate right wall 124.

Similarly to the embodiment shown in FIG. 4, the adhesive membrane resides about the perimeter of the cathode plate 68. However, in the embodiment illustrated in FIG. 5, two adhesive membranes 72 are positioned between opposed facing anode plates 66 and about the perimeter of the cathode plate 68. As shown in FIGS. 3 and 5, a first adhesive membrane 72A is supported on a top surface 162 of the anode plate 66 and a second adhesive membrane 72B is supported on a bottom surface 164 of an adjacent anode plate 66. The cathode plate 68 resides between the two adjacent anode plates 66.

FIG. 6 illustrates a cross-sectional view of an alternate embodiment of an electrode assembly 250 of the present invention. Like the previous electrode assemblies, electrode assembly 250 comprises multiple anode and cathode plates 66, 68 positioned in an alternating fashion. Specifically, seven anode plates and six cathode plates are positioned in an alternating sequence in the stack assembly. However, unlike the previous assemblies, assembly 250 comprises an anode separator 155 that encloses the anode material 106 therewithin. The anode separator 155 comprises the same material as the cathode separator 146 as previously discussed.

Figure 7:
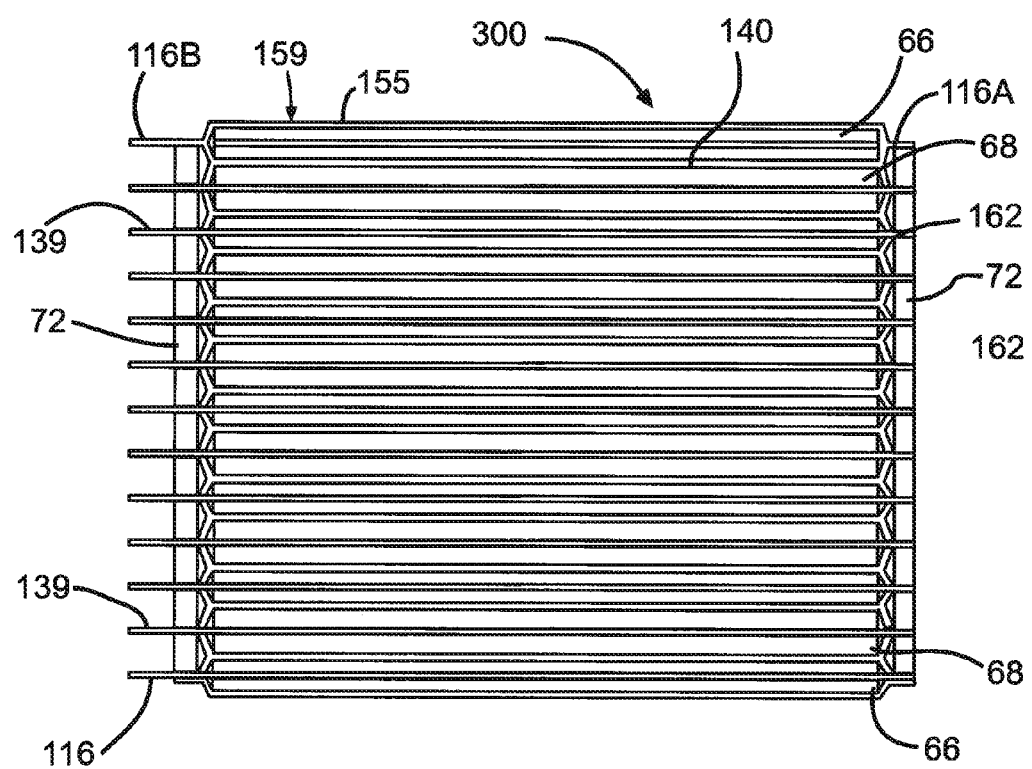
FIG. 7 is a cross-sectional side view of an additional embodiment of a multiplate electrode assembly of the present invention.

FIG. 7 illustrates yet another embodiment of an electrode assembly 300 of the present invention. In this embodiment, the anode and cathode plates 66, 68 are of a similar length. Anode and cathode plates 66, 68 of a similar length are beneficial in the construction of primary, non-rechargeable cell cells. In addition, a series of adhesive membranes 72 have been positioned between adjacent left and right lead portions 139, 162 of the cathode plates 68 and the right and left lead portions 116A, 116B of the anode plates 66. Alternatively, the adhesive membrane 72 may be positioned around the perimeters of both of the anode 66 and cathode 66 plates.

More specifically, the adhesive membrane 72, may be positioned such that the adhesive membrane top surface 158 is in contact with either the first cathode lead portion 116B or the second cathode lead portion 116A. The adhesive membrane bottom surface 160 is in contact with either the first anode lead portion 139 or the second anode lead portion 162. Furthermore, that adhesive membrane right sidewall 161A or the adhesive membrane left sidewall 161B is in contact with the anode separator 155 or the cathode separator 140.

FIG. 8 illustrates an alternate embodiment of an electrode plate assembly 350 comprising electrode plates of decreasing length. As shown, starting from the first bottom electrode position, the length of the anode plates 66 decrease as the assembly progresses to the top and final electrode position. Likewise, the length of the corresponding cathode plates 68 also becomes progressively shorter. In this embodiment, it is preferred that the length of the cathode plate 68 is shorter than the length of the immediately adjacent anode plates 66. This preferred plate orientation enables the first and second adhesive membranes 72A and 72B to be positioned such that the cathode plate 68, particularly, the cathode electrode material 134 resides therebetween.

FIGS. 9A-C, 10A-C, 11A-C and 12A-C illustrate non-limiting examples of which the geometry of the casing 64 of the electrochemical cell 60 of the present invention may comprise. These examples are for illustrative purposes and are not meant to be limiting. It is contemplated that the geometry of the casing 64 could be of a multitude of container shapes and forms.

FIGS. 9A, 9B and 9C illustrates side, top, and front end views of a casing embodiment 500 comprising opposed front and backside walls 502 and 504 extending to a left end wall 506 and a right end wall 508. The end walls 506 and 508 are planar, although that is not necessary. Left end wall 506 may be longer in length than right end wall 508, and both extend to a bottom wall 510 of an irregularly curved shape. Lid 512 encloses casing 500.

FIGS. 10A, 10B, and 10C illustrate side, top, and front end views of an alternative embodiment of casing 550 comprising opposed front and backside walls 552 and 554 extending to a left end wall 556 and a right end wall 558. Like casing 500, casing embodiment 550 comprises planar end walls 556 and 558, although that is not necessary. As shown, both the right end wall 558 and the left end wall 556 curved towards each other to form end wall 560. Lid 562 encloses the casing 552.

FIGS. 11A, 11B, and 11C illustrate side, top, and front end views of an alternative embodiment of casing 600 comprising opposed front and backside walls 602 and 604 extending to a left end wall 606 and a right end wall 608. As illustrated, left end wall 606 has a curved surface that extends from edge 610 to the right end wall 608 at edge 612. Right end wall 608 is planar, although not necessary. Lid 614 encloses casing embodiment 600.

FIGS. 12A, 125, and 12C illustrate side, top, and front end views of an alternative embodiment of casing 650 comprising opposed front and backside walls 652 and 654 extending to a curved left end wall 656 and a curved right end wall 658. As illustrated, the front end wall 652 has a curved surface whose end points meet at the planar backside wall 654. As illustrated, the front side wall 652 has a curved surface that extends from the planar bottom sidewall 654. A lid 660 encloses the casing 650.

The electrode assembly process begins with construction of the anode and cathode current collectors 114, 132. First, each side of a substrate of conductive material (not shown) is coated with an electrode active material mixture (not shown) in selected areas. The electrode active mixture typically comprises an anode or cathode active material, a binder such as a fluoro-resin powder and a conductive diluent such as a powdered carbonaceous material. This mixture in slurry form is sprayed, brushed, rolled, spread or otherwise contacted to the substrate to coat areas from which electrodes will later be cut. Suitable materials for the substrate of the anode and cathode current collectors 114, 132 include stainless steel, titanium, tantalum, platinum, gold, aluminum, cobalt nickel alloys, highly alloyed ferritic stainless steel containing molybdenum and chromium, and nickel-, chromium-, and molybdenum-containing alloys.

The thusly-coated substrate is then moved through an oven (not shown) to drive off any volatile compounds in the slurry and to cure the electrode active mixture contacted to the substrate. Next, the electrode plates are cut from the conductive substrate in the precise shape dictated by the casing. Second, the electrode active material is coated to the coated substrate, cured and leaving the selectively coated substrate from which the electrode plates are subsequently cut.

Once the electrode plates 66, 68 have been formed, the separator material is positioned between the anode plate 66 and the cathode plate 68. In an embodiment, the cathode separator 140 is positioned over the cathode plate 68 such that the cathode material 134 is enveloped within. More preferably, a bottom surface of the separator material 134 is positioned in contact with a first layer of the cathode material 140 and a second layer of separator material 140 is positioned in contact with the top surface of the cathode 68. The first and second layers of separator material 140 are heat treated at their respective ends to seal the cathode material 134 therewithin. If desired, the anode separator 156 may be positioned around the anode plate 66. In the same manner as the cathode separator 140, a first layer of separator material is positioned in contact with the bottom surface of the anode material 106 and a second layer of separator material is positioned in contact with the top surface of the anode material 106. The first and second layers of separator material are heated at their respective ends to seal the anode material 106 therewithin.

The electrodes 66, 68 are then positioned in the desired stacked orientation, which may include the electrode assembly embodiments illustrated in FIGS. 4-11. The adhesion membrane 72 is positioned between the electrode plates, more specifically between opposed facing plates 66, 68 along at least a portion of the perimeter of either the anode or cathode electrode plate 66, 68. Once the stack of electrodes 66, 68 and adhesion membranes 72 are complete, the electrode assembly is then laminated together at a temperature ranging from about 100° C. to about 200° C. for about 5 minutes to about 30 minutes with a pressure of about 0.5 lb-f to about 5 lb-f. Alternatively, each pair of alternating electrodes 66, 68 may be laminated immediately after each pair is positioned within the assembly as the stack is built.

After construction of the multiplate electrode assembly is completed, the stack is inserted into the casing to substantially occupy the internal volume thereof, a conductive structure connects the connectors 116, 139 to their respective terminals. This may take the form of connecting the anode connector to an anode lead (not shown) welded to the interior of the casing 64 or to the lid 92 for a cell in a case-negative design with the cathode connector welded to the terminal pin 94 insulated from the lid 92 and casing 64 by the glass-to-metal seal 96. Additionally, the anode lead may be pinched between the lid and the casing and subsequently fused as they are hermetically welded together. Methods of welding include, but are not limited to, resistance welding, plasma welding, ultrasonic welding and laser welding. Regardless of where the anode lead is welded to the casing 64, the lid 92 is hermetically sealed thereto.

The electrode assembly is useful in an electrochemical cell of either a primary chemistry or a secondary, rechargeable chemistry. For both the primary and secondary types, the cell comprises an anode active metal selected from Groups IA, IIA and IIIB of the Periodic Table of the Elements, including lithium, sodium, potassium, etc., and their alloys and intermetallic compounds including, for example, Li—Si, Li—Al, Li—B, Li—Mg and Li—Si—B alloys and intermetallic compounds. The preferred metal comprises lithium. An alternate negative electrode comprises a lithium alloy, such as lithium-aluminum alloy. The greater the amount of aluminum present by weight in the alloy, however, the lower the energy density of the cell.

For a primary cell, the anode is a thin metal sheet or foil of the lithium material, pressed or rolled on a metallic anode current collector, i.e., preferably comprising nickel, to form the negative electrode. In the exemplary cell of the present invention, the negative electrode has an extended tab or lead of the same material as the current collector, i.e., preferably nickel, integrally formed therewith such as by welding and contacted by a weld to a cell case of conductive material in a case-negative electrical configuration. Alternatively, the negative electrode may be formed in some other geometry, such as a bobbin shape, cylinder or pellet to allow an alternate low surface cell design.

In secondary electrochemical systems, the anode or negative electrode comprises an anode material capable of intercalating and de-intercalating the anode active material, such as the preferred alkali metal lithium. A carbonaceous negative electrode comprising any of the various forms of carbon (e.g., coke, graphite, acetylene black, carbon black, glassy carbon, etc.) which are capable of reversibly retaining the lithium species, is preferred for the anode material. A "hairy carbon"

material is particularly preferred due to its relatively high lithium-retention capacity. "Hairy carbon." is a material described in U.S. Pat. No. 5,443,928 to Takeuchi et al., which is assigned to the assignee of the present invention and incorporated herein by reference. Graphite is another preferred material. Regardless of the form of the carbon, fibers of the carbonaceous material are particularly advantageous because they have excellent mechanical properties that permit them to be fabricated into rigid electrodes that are capable of withstanding degradation during repeated charge/discharge cycling. Moreover, the high surface area of carbon fibers allows for rapid charge/discharge rates.

A typical negative electrode for a secondary cell is fabricated by mixing about 90 to 97 weight percent "hairy carbon" or graphite with about 3 to 10 weight percent of a binder material, which is preferably a fluoro-resin powder such as polytetrafluoroethylene (PTFE), polyvinylidene fluoride (PVDF), polyethylenetetrafluoroethylene (ETFE), polyamides, polyimides, and mixtures thereof. This negative electrode admixture is provided on a current collector such as of a nickel, stainless steel, or copper foil or screen by casting, pressing, rolling or otherwise contacting the admixture thereto.

In either the primary cell or the secondary cell, the reaction at the positive electrode involves conversion of ions that migrate from the negative electrode to the positive electrode into atomic or molecular forms. For a primary cell, the cathode active material comprises a carbonaceous chemistry or at least a first transition metal chalcogenide constituent which may be a metal, a metal oxide, or a mixed metal oxide comprising at least a first and a second metals or their oxides and possibly a third metal or metal oxide, or a mixture of a first and a second metals or their metal oxides incorporated in the matrix of a host metal oxide. The cathode active material may also comprise a metal sulfide.

Carbonaceous active materials are preferably prepared from carbon and fluorine, which includes graphitic and non-graphitic forms of carbon, such as coke, charcoal or activated carbon. Fluorinated carbon is represented by the formula $(CF_x)_n$ wherein x varies between about 0.1 to 1.9 and preferably between about 0.5 and 1.2, and $(C_2F)_n$ wherein n refers to the number of monomer units which can vary widely.

The metal oxide or the mixed metal oxide is produced by the chemical addition, reaction, or otherwise intimate contact of various metal oxides, metal sulfides and/or metal elements, preferably during thermal treatment, sol-gel formation, chemical vapor deposition or hydrothermal synthesis in mixed states. The active materials thereby produced contain metals, oxides and sulfides of Groups IB, IIB, IIIB, IVB, VB, VIB, VIIB and VIII, which include the noble metals and/or other oxide and sulfide compounds. A preferred cathode active material is a reaction product of at least silver and vanadium.

One preferred mixed metal oxide is a transition metal oxide having the general formula $SM_xV_2O_y$, where SM is a metal selected from Groups IB to VIIB and VIII of the Periodic Table of Elements, wherein x is about 0.30 to 2.0 and y is about 4.5 to 6.0 in the general formula. By way of illustration, and in no way intended to be limiting, one exemplary cathode active material comprises silver vanadium oxide having the general formula $Ag_xV_2O_y$, in any one of its many phases, i.e., β-phase silver vanadium oxide having in the general formula x=0.35 and y=5.8, γ-phase silver vanadium oxide having in the general formula x=0.80 and y=5.40 and ξ-phase silver vanadium oxide having in the general formula x=1.0 and y=5.5, and combination and mixtures of phases thereof. For a more detailed description of such cathode active materials, reference is made to U.S. Pat. No. 4,310,609 to Liang et al., which is assigned to the assignee of the present invention and incorporated herein by reference.

Another preferred composite transition metal oxide cathode material includes $V_2O_z$ wherein z≤5 combined with $Ag_2O$ having silver in either the silver(II), silver(I) or silver(0) oxidation state and CuO with copper in either the copper(II), copper(I) or copper(0) oxidation state to provide the mixed metal oxide having the general formula $Cu_xAg_yV_2O_z$, (CSVO). Thus, the composite cathode active material may be described as a metal oxide-metal oxide-metal oxide, a metal-metal oxide-metal oxide, or a metal-metal-metal oxide and the range of material compositions found for $Cu_xAg_yV_2O_z$ is preferably about 0.01≤z≤6.5. Typical forms of CSVO are $Cu_{0.16}Ag_{0.67}V_2O_z$ with z being about 5.5 and $Cu_{0.5}Ag_{0.5}V_2O_z$ with z being about 5.75. The oxygen content is designated by z since the exact stoichiometric proportion of oxygen in CSVO can vary depending on whether the cathode material is prepared in an oxidizing atmosphere such as air or oxygen, or in an inert atmosphere such as argon, nitrogen and helium. For a more detailed description of this cathode active material, reference is made to U.S. Pat. No. 5,472,810 to Takeuchi et al. and U.S. Pat. No. 5,516,340 to Takeuchi et al., both of which are assigned to the assignee of the present invention and incorporated herein by reference.

In addition to the previously described fluorinated carbon, silver vanadium oxide and copper silver vanadium oxide, $Ag_2O$, $Ag_2O_2$, $CuF_2$, $Ag_2CrO_4$, $MnO_2$, $V_2O_5$, $MnO_2$, $TiS_2$, $Cu_2S$, FeS, $FeS_2$, copper oxide, copper vanadium oxide, and mixtures thereof are contemplated as useful active materials.

In secondary cells, the positive electrode preferably comprises a lithiated material that is stable in air and readily handled. Examples of such air-stable lithiated cathode active materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCu_{0.92}Sn_{0.08}O_2$ and $LiCo_{1-x}Ni_xO_2$. A preferred secondary couple is of a carbonaceous anode material and a lithium cobalt oxide cathode active material.

To charge such secondary cells, the lithium ion comprising the positive electrode is intercalated into the carbonaceous negative electrode by applying an externally generated electrical potential to the cell. The applied recharging electrical potential serves to draw lithium ions from the cathode active material, through the electrolyte and into the carbonaceous material of the negative electrode to saturate the carbon. The resulting $Li_xC_6$ negative electrode can have an x ranging between 0.1 and 1.0. The cell is then provided with an electrical potential and is discharged in a normal manner.

An alternate secondary cell construction comprises intercalating the carbonaceous material with the active lithium material before the negative electrode is incorporated into the cell. In this case, the positive electrode body can be solid and comprise, but not be limited to, such active materials as manganese dioxide, silver vanadium oxide, titanium disulfide, copper oxide, copper sulfide, iron sulfide, iron disulfide and fluorinated carbon. However, this approach is compromised by problems associated with handling lithiated carbon outside of the cell. Lithiated carbon tends to react when contacted by air or water.

The above described cathode active materials, whether of a primary or a secondary chemistry, are incorporation into an electrochemical cell by mixing one or more of them with a binder material. Suitable binders are powdered fluoro-polymers; more preferably powdered polytetrafluoroethylene or powdered polyvinylidene fluoride present at about 1 to about 5 weight percent of the cathode mixture. Further, up to about 10 weight percent of a conductive diluent is preferably added to the cathode mixture to improve conductivity. Suitable materials for this purpose include acetylene black, carbon black and/or graphite or a metallic powder such as powdered nickel, aluminum, titanium and stainless steel. The preferred cathode active mixture thus includes a powdered fluoro-polymer binder present at about 1 to 5 weight percent, a conductive diluent present at about 1 to 5 weight percent and about 90 to 98 weight percent of the cathode active material. Cathode components are prepared by contacting the cathode active mixture in the form of a slurry onto one of the previously described conductive substrates serving as a current collector. The preferred cathode current collector material is titanium, and most preferably the titanium cathode current collector has a thin layer of graphite/carbon paint applied thereto.

In order to prevent internal short circuit conditions, the cathode is separated from the Group IA, IIA or IIIB anode by a suitable separator material. The separator is of electrically insulative material, and the separator material also is chemically unreactive with the anode and cathode active materials and both chemically unreactive with and insoluble in the electrolyte. In addition, the separator material has a degree of porosity sufficient to allow flow there through of the electrolyte during the electrochemical reaction of the cell. Illustrative separator materials include fabrics woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, a polytetrafluoroethylene membrane commercially available under the designation ZITEX (Chemplast Inc.), a polypropylene membrane commercially available under the designation. CELGARD (Celanese Plastic Company, Inc.) and a membrane commercially available under the designation DEXIGLAS (C. H. Dexter, Div., Dexter Corp.).

The electrochemical cell of the present invention further includes a nonaqueous, ionically conductive electrolyte that serves as a medium for migration of ions between the anode and the cathode electrodes during the electrochemical reactions of the cell. The electrochemical reaction at the electrodes involves conversion of ions in atomic or molecular forms that migrate from the anode to the cathode. Thus, nonaqueous electrolytes suitable for the present invention are substantially inert to the anode and cathode materials, and they exhibit those physical properties necessary for ionic transport, namely, low viscosity, low surface tension and wettability.

A suitable electrolyte has an inorganic, ionically conductive salt dissolved in a nonaqueous solvent, and more preferably, the electrolyte includes an ionizable alkali metal salt dissolved in a mixture of aprotic organic solvents comprising a low viscosity solvent and a high permittivity solvent. The inorganic, ionically conductive salt serves as the vehicle for migration of the anode ions to intercalate or react with the cathode active materials. Preferably, the ion forming alkali metal salt is similar to the alkali metal comprising the anode. In the case of an anode comprising lithium, the electrolyte salt is a lithium-based salt selected from $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, LiSCN, $LiO_3SCF_3$, $LiC_6F_5SO_3$, $LiO_2CCF_3$, $LiSO_6F$, $LiB(C_6H_5)_4$, $LiCF_3SO_3$, and mixtures thereof.

Low viscosity solvents useful with the present invention include esters, linear and cyclic ethers and dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy, 2-methoxyethane (EME), ethyl methyl carbonate (EMC), methyl propyl carbonate, ethyl propyl carbonate, diethyl carbonate (DEC), dipropyl carbonate, and mixtures thereof, and high permittivity solvents include cyclic carbonates, cyclic esters and cyclic amides such as propylene carbonate (PC), ethylene carbonate (EC), butylene carbonate, acetonitrile, dimethyl sulfoxide, dimethyl formamide, dimethyl acetamide, γ-valerolactone, γ-butyrolactone (GBL), N-methyl-pyrrolidinone (NMP), and mixtures thereof. In the present invention, the preferred anode for a primary cell is lithium metal and the preferred electrolyte is 0.8M to 1.5M $LiAsF_6$ or $LiPF_6$ dissolved in a 50:50 mixture, by volume, of propylene carbonate as the preferred high permittivity solvent and 1,2-dimethoxyethane as the preferred low viscosity solvent.

A preferred electrolyte for a secondary cell of an exemplary carbon/$LiCoO_2$ couple comprises a solvent mixture of EC:DMC:EMC:DEC. Most preferred volume percent ranges for the various carbonate solvents include EC in the range of about 20% to about 50%; DMC in the range of about 12% to about 75%; EMC in the range of about 5% to about 45%; and DEC in the range of about 3% to about 45%. In a preferred form of the present invention, the electrolyte activating the cell is at equilibrium with respect to the mole ratio of DMC:EMC:DEC. This is important to maintain consistent and reliable cycling characteristics. It is known that due to the presence of low-potential (anode) materials in a charged cell, an un-equilibrated molar mixture of DMC:DEC in the presence of lithiated graphite ($LiC_6 \approx 0.01$ V vs $Li/Li^+$) results in a substantial amount of EMC being formed. When the concentrations of DMC, DEC and EMC change, the cycling characteristics and temperature rating of the cell change. Such unpredictability is unacceptable. This phenomenon is described in detail in U.S. Pat. No. 6,746,804 to Can et al., which is assigned to the assignee of the present invention and incorporated herein by reference. Electrolytes containing the quaternary carbonate mixture of the present invention exhibit freezing points below −50° C., and lithium ion secondary cells activated with such mixtures have very good cycling behavior at room temperature as well as very good discharge and charge/discharge cycling behavior at temperatures below −40° C.

The glass used in the glass-to-metal seals is of a corrosion resistant type having up to about 50% by weight silicon such as CABAL 12, TA 23, FUSITE 425 or FUSITE 435. The positive terminal leads preferably comprise titanium although molybdenum, aluminum, nickel alloy, or stainless steel can also be used. The cell lids are typically of a material similar to that of the casing.

It is appreciated that various modifications to the present inventive concepts described herein may be apparent to those of ordinary skill in the art without departing from the spirit and scope of the present invention as defined by the herein appended claims.

What is claimed is:
1. An electrochemical cell, which comprises:
a) an anode comprising an anode active material contacted to at least one of opposed major sides of an anode current collector to provide at least one anode plate having an anode plate perimeter, wherein an anode current collector lead extends outwardly past the anode plate perimeter;
b) a cathode comprising a cathode active material contacted to at least one of opposed major sides of a cathode current collector to provide at least one cathode plate having a cathode plate perimeter, wherein a cathode current collector lead extends outwardly past the cathode plate perimeter;
c) a casing comprising a sidewall extending to an opening;
d) a separator disposed intermediate the anode active material of the at least one anode plate facing the cathode active material of the at least one cathode plate;
e) an adhesive membrane having opposed first and second adhesive sides, wherein the first adhesive side is positioned in direct contact with the anode plate or the cathode plate and the second adhesive side is positioned in direct contact with the anode lead or the cathode lead of an immediately adjacent other of the anode plate or the cathode plate not in direct contact with the first adhesive side;
f) a lid closing the opening of the casing; and
g) an electrolyte in the casing to activate the anode and cathode.

2. The electrochemical cell of claim 1 wherein there are at least two anode plates with an intermediate cathode plate.

3. The electrochemical cell of claim 1 wherein the adhesive membrane is composed of a material that is non-reactive with the electrolyte.

4. The electrochemical cell of claim 1 wherein the adhesive membrane comprises a carrier layer composed of polypropylene having first and second carrier layer sides, wherein at least one adhesive layer composed of an acryl material resides on each of the carrier layer first and second sides.

5. The electrochemical cell of claim 1 wherein the adhesive membrane further comprises an adhesive membrane inner boundary spaced apart from an adhesive membrane outer boundary, wherein the adhesive membrane inner boundary is positioned adjacent to the at least one anode plate or cathode plate and the adhesive membrane outer boundary is positioned within about 0.25 inches from an outer edge of the other of the at least one anode plate or cathode plate.

6. The electrochemical cell of claim 1 wherein the adhesive membrane extends circumferentially around the anode plate perimeter or the cathode plate perimeter.

7. The electrochemical cell of claim 1 wherein the casing comprises spaced apart first and second major casing side walls extending to and meeting with an end wall, the casing end wall and first and second major casing side walls extending to the opening, and wherein the first and second major casing side walls are of substantially the same area.

8. The electrochemical cell of claim 1 wherein the casing comprises spaced apart first and second major casing side walls extending to and meeting with an end wall, the casing end wall and first and second major casing side walls extending to the opening, and wherein the first and second major casing side walls are of substantially the same shape.

9. The electrochemical cell of claim 1 wherein the casing comprises spaced apart first and second major casing side walls extending to and meeting with an end wall, the casing end wall and first and second major casing side walls extending to the opening, and wherein the at least one anode plate and the at least one cathode plate are of substantially the same area as the respective first and second casing major side walls.

10. The electrochemical cell of claim 1 wherein the casing comprises spaced apart first and second major casing side walls extending to and meeting with an end wall, the casing end wall and first and second major casing side walls extending to the opening, wherein the casing end wall comprises a right end wall portion and a left end wall portion, both right and left end wall portions extending from the opening to a bottom wall portion and wherein one of the right and left end wall portions is longer than the other of the end wall portion so that the bottom wall curves upwardly from the longer one of the right and left end wall portions to the other end wall portion.

11. The electrochemical cell of claim 9 wherein there are at least two anode plates and at least one cathode plate intermediate the anode plates with a first one of the anode plates positioned adjacent to the first major casing side wall and a second one of the anode plates positioned adjacent to the second major casing side wall and wherein the first and second anode plates are themselves of dissimilar area sizes, but of a similar area as the respective first and second casing side walls to which they are closest.

12. The electrochemical cell of claim 1 wherein the lid comprises an electrolyte fill opening and wherein a pin that serves as an electrochemical cell terminal is supported by the lid in non-conductive relation with the lid and casing.

13. The electrochemical cell of claim 1 wherein the cell is either of a primary lithium/silver vanadium oxide chemistry or a secondary chemistry comprising a carbonaceous anode active material and lithium cobalt oxide cathode active material.

14. An electrode assembly, for use in an electrochemical cell which comprises:
a) an anode comprising an anode active material contacted to opposed major sides of an anode current collector to provide at least one anode plate having an anode plate perimeter, wherein an anode current collector lead extends outwardly past the anode plate perimeter;
b) a cathode comprising a cathode active material contacted to opposed major sides of a cathode current collector to provide at least one cathode plate having a cathode plate perimeter, wherein a cathode current collector lead extends outwardly past the cathode plate perimeter;
c) a separator disposed intermediate the at least one anode plate and the at least one cathode plate;
d) an adhesive membrane having opposed first and second adhesive sides; and
e) wherein at least a portion of the first adhesive side is positioned in direct contact with the anode plate or the cathode plate and the second adhesive side is positioned in direct contact with the anode lead or the cathode lead of an immediately adjacent other of the anode plate or cathode plate not in direct contact with the first adhesive side.

15. The electrode assembly of claim 14 wherein the at least one cathode plate is of substantially the same shape, but of a lesser size than the at least one anode plate.

16. The electrode assembly of claim 14 wherein there are at least two anode plates with an intermediate cathode plate.

17. The electrode assembly of claim 14 wherein the adhesive membrane is composed of a material that is non-reactive with the electrolyte.

18. The electrode assembly of claim 14 wherein an outer boundary of the adhesive membrane is positioned within about 0.25 inches proximal the outer perimeter of the other of the anode and cathode plates not in direct contact with the first adhesive membrane side surface.

19. The electrode assembly of claim 14 wherein the cathode active material comprises a silver vanadium oxide chemistry or a lithium cobalt oxide chemistry and the anode active material comprises a carbonaceous chemistry or a lithium comprising chemistry.

20. The electrochemical assembly of claim 14 wherein the adhesive membrane extends circumferentially around the anode plate perimeter or the cathode plate perimeter.

21. An electrode assembly, for use in an electrochemical cell which comprises:
   a) an anode comprising an anode active material contacted to opposed major sides of an anode current collector to provide at least one anode plate, wherein an anode current collector lead extends outwardly past the anode plate;
   b) a cathode comprising a cathode active material contacted to opposed major sides of a cathode current collector to provide at least one cathode plate, wherein a cathode current collector lead extends outwardly past the cathode plate;
   c) a separator disposed intermediate the anode active material of the at least one anode plate facing the cathode active material of the at least one cathode plate; and
   d) an adhesive membrane having opposed first and second sides, wherein the adhesive membrane comprises a carrier layer composed of polypropylene having first and second carrier layer sides, wherein at least one adhesive layer composed of an acryl material resides on each of the carrier layer first and second sides, and wherein a first adhesive layer on the first adhesive layer side is positioned in direct contact with the anode plate or the cathode plate and a second adhesive layer on the second adhesive layer side is positioned in direct contact with the anode lead or the cathode lead of the other of the anode plate or cathode plate not in direct contact with the first adhesive membrane side.

22. The electrode assembly of claim 21 wherein there are at least two anode plates with an intermediate cathode plate.

23. The electrode assembly of claim 21 wherein the adhesive membrane further comprises an adhesive membrane inner boundary that extends to an adhesive membrane outer boundary, wherein the adhesive membrane inner boundary is positioned adjacent the anode plate or the cathode plate and the adhesive membrane outer boundary is positioned within about 0.25 inches from an outer edge of the other of the anode plate or cathode plate.

24. The electrode assembly of claim 21 wherein the adhesive membrane extends circumferentially around the anode plate perimeter or the cathode plate perimeter.

25. The electrode assembly of claim 21 wherein the cathode active material comprises a silver vanadium oxide chemistry or a lithium cobalt oxide chemistry and the anode active material comprises a carbonaceous chemistry or a lithium comprising chemistry.

26. The electrode assembly of claim 21 wherein the at least one cathode plate is of substantially the same shape, but of a lesser size than at least one anode plate.

* * * * *